United States Patent [19]

Takai et al.

[11] Patent Number: 5,072,707
[45] Date of Patent: Dec. 17, 1991

[54] SPLIT THRUST BEARING FOR OUTBOARD ENGINE

[75] Inventors: Kiichiro Takai; Haruo Sano, both of Nagoya, Japan

[73] Assignee: Aichi Kikai Kogyo Kabushiki Kaisha, Nagoya, Japan

[21] Appl. No.: 454,987

[22] Filed: Dec. 22, 1989

[30] Foreign Application Priority Data

Dec. 26, 1988 [JP] Japan .......................... 63-168028[U]
Nov. 4, 1989 [JP] Japan ............................ 1-129185[U]

[51] Int. Cl.$^5$ .............................................. F02B 75/02
[52] U.S. Cl. .................................... 123/311; 384/420; 384/429
[58] Field of Search ............. 123/559.1, 540, 196 AB, 123/311; 184/104.1, 104.2; 384/420, 906; 440/83, 49, 88, 420, 429, 906

[56] References Cited

U.S. PATENT DOCUMENTS

| 3,493,081 | 2/1965 | Tado | 123/196 AB |
| 4,165,720 | 8/1979 | Barcak | 123/540 |
| 4,243,010 | 1/1981 | Zopfi | 123/559.1 |
| 4,393,852 | 7/1983 | Merrit et al. | 123/559.1 |
| 4,709,671 | 12/1987 | Sumigawa | 123/196.5 |

FOREIGN PATENT DOCUMENTS 61-278494 9/1986 Japan ..................... 440/88

Primary Examiner—Richard A. Bertsch
Assistant Examiner—Charles Freay
Attorney, Agent, or Firm—Dennison, Meserole, Pollack & Scheiner

[57] ABSTRACT

A four cycle outboard engine having a crankshaft substantially vertically oriented when running A cylindrical block supporting the crankshaft. A thrust metal composed of a pair of semi-circular plates of different thicknesses are mounted in semi-circular grooves of differing depth formed on the bearing portions of the cylinder block and mounted in such a way that the semi-circular plate having the greater thickness contacts the end surface of the semi-circular groove having the shallower depth.

1 Claim, 8 Drawing Sheets

FIG. 3
FIG. 4
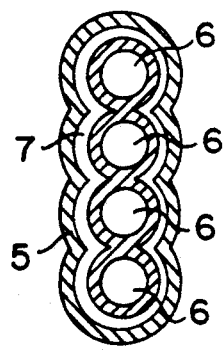
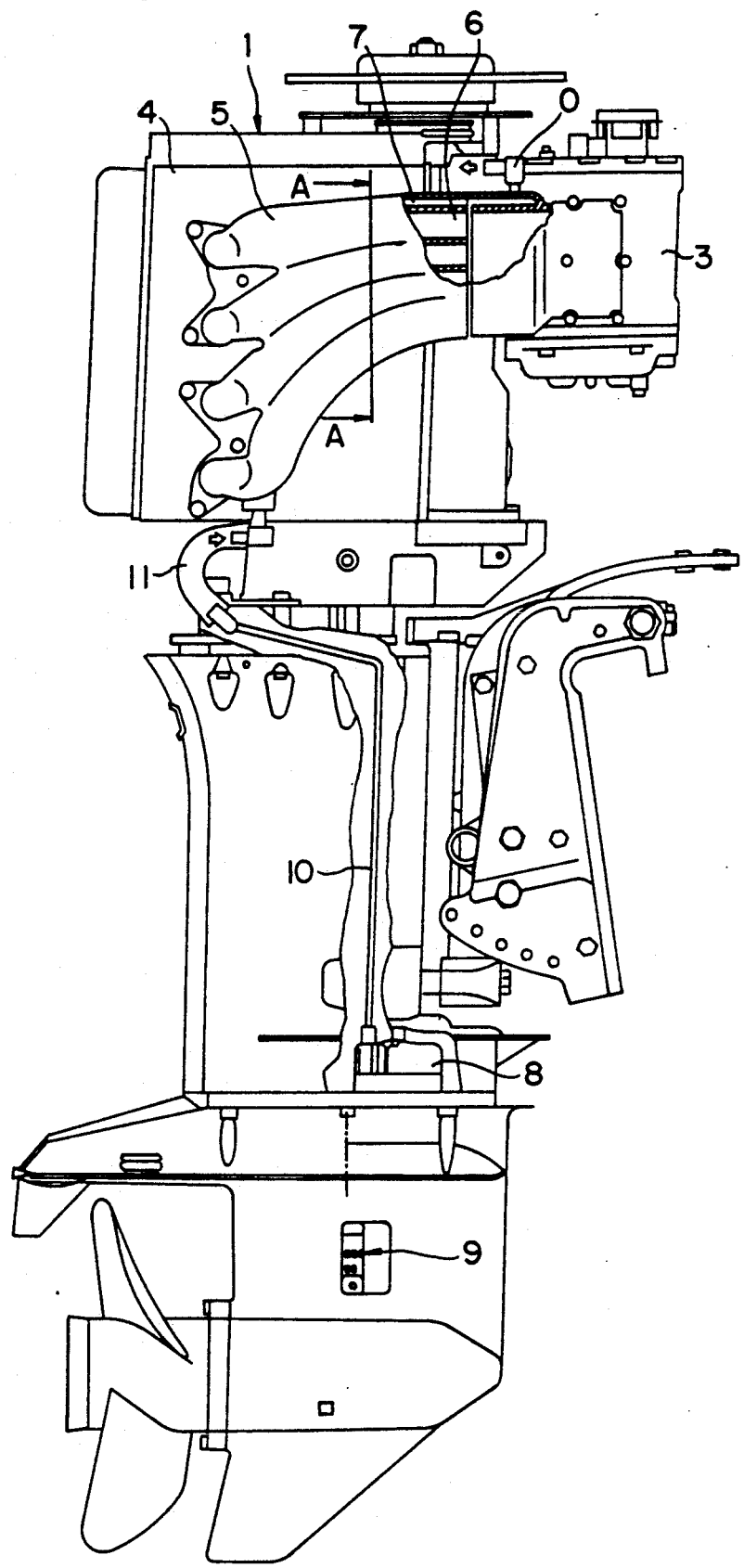

SPLIT THRUST BEARING FOR OUTBOARD ENGINE

BACKGROUND OF THE INVENTION

This invention relates to the improvement of performance of an outboard engine.

A two-cycle outboard engine has heretofore mainly been used on a boat for leisure-time amusement and fishing because a two-cycle engine is small and light weight and yet capable of developing great power.

However, the engine also has a problem of causing water pollution because of the mixed fuel it uses. It also gives an unpleasant feeling to people because it exhausts a lot of hydrocarbon (hereinafter referred to as HC). Furthermore the engine is sometimes difficult to start as the plug is susceptible to damage.

An object of the present invention is to provide a four-cycle outboard engine equipped with a supercharger in order to solve the problems of a two-cycle engine and yet to maintain great power.

Another object is to provide a multi-cylinder outboard engine which has a good mixture-distributing condition for each cylinder.

A further object is to provide an outboard engine which can cool the air or mixture in the intake manifold supplied by the supercharger, connecting the supercharger with each port of the cylinder heads.

A further object is to provide an outboard engine which can prevent an engine burning out by cooling the lubricating oil in the oil pan.

A further object is to provide an outboard engine that has a lubricating oil-supplying hole through which the oil can be supplied on board and the inspection of the condition of the oil can be precisely done on board.

A further object is to provide an outboard engine which has a thrust metal with somewhat free-setting location on the crankshaft and with rotary stopper means which need not a lot of machining processes.

GENERAL DESCRIPTION OF THE INVENTION

An outboard engine of this invention comprises a four-cycle engine equipped with a supercharger which is attached between the intake manifold and the carburetor, therefore this engine causes no water pollution, which is one of the defects of a two-cycle engine, and it operates in a condition with very little HC discharged or a foul odor. Also it is easy to start and develops the same amount of power as a two-cycle engine. Furthermore, as the supercharger is located under the carburetor, mixture is supplied evenly into each cylinder of the engine, producing a good power-developing condition. Then a secondary effect of the good adaptability of the engine to the acceleration operation, is that the supercharger is attached in close proximity to the engine.

BRIEF EXPLANATION OF THE DRAWINGS

FIG. 3 is a cut side view of an outboard engine in the second embodiment.

FIG. 4 is a A—A line cross-sectional view of FIG. 3.

DETAILED DESCRIPTION OF THE PREFERRED EMBODIMENT

Figure 1:
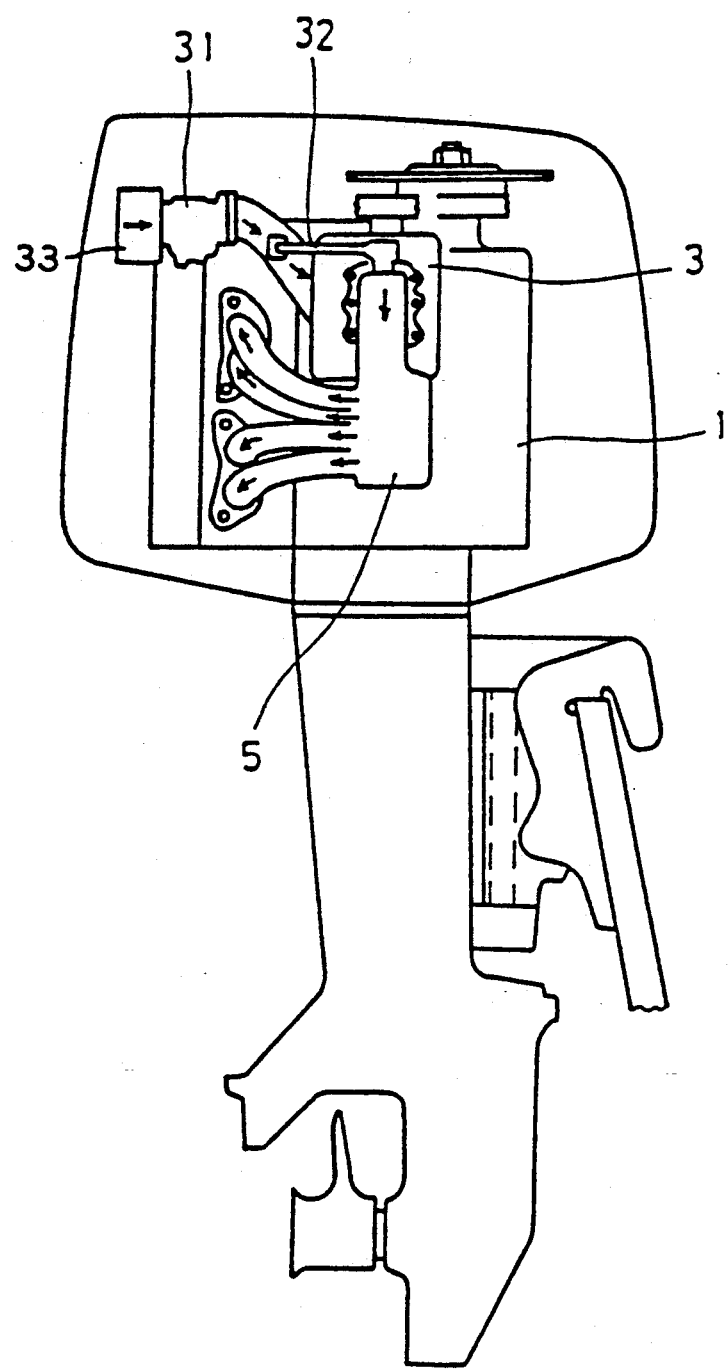
FIG. 1 is a view for showing the general construction of an outboard engine in the first embodiment of this invention.

This invention will be explained in detail according to the drawing showing the embodiments as follows.

FIG. 1 is a view for showing the general construction of an outboard engine in the first embodiment.

Figure 2:
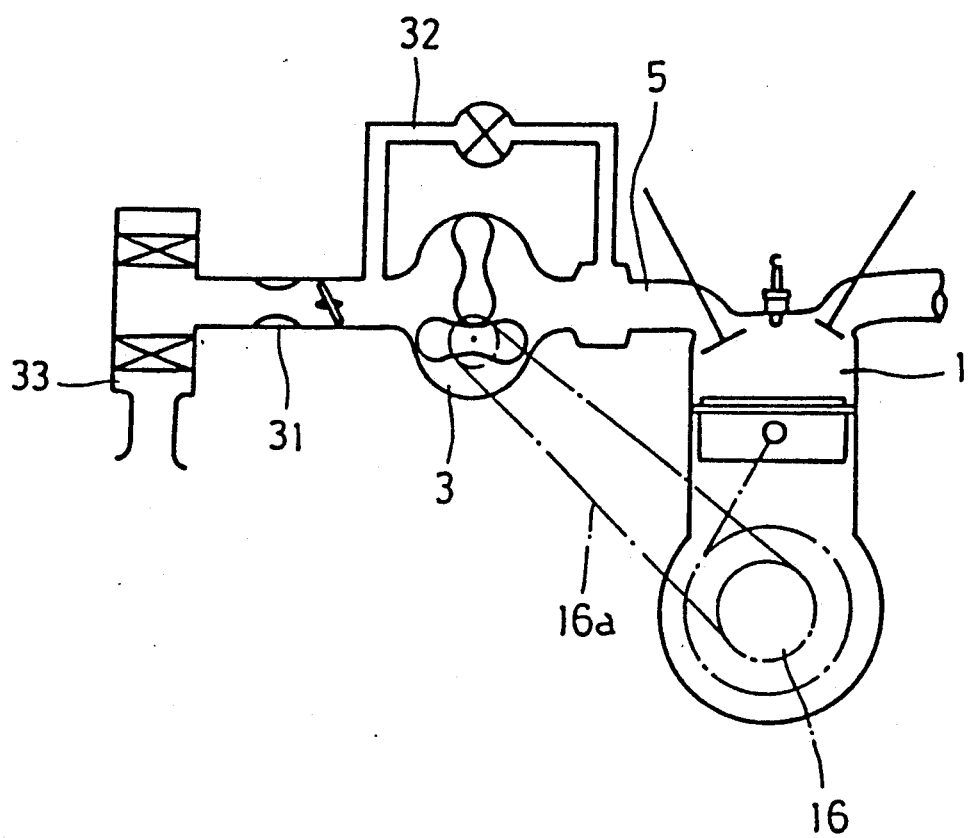
FIG. 2 is a view for showing the location of each part of the engine.

FIG. 2 is a view for showing the general construction of an engine. In this figure, the outboard engine 1 is equipped with an attached supercharger 3. This supercharger is connected to the engine 1 by the crankshaft 16, by which rotation the engine is driven. In this embodiment, the supercharger 3 is located between the intake manifold 5 and carburetor 31 of the engine. The bypass 32 is also located between the carburetor 31 and the intake manifold 5, and 33 in the figure is an air cleaner.

In this way, the outboard engine in this embodiment is not only easy to start with steady idling as the ignition plug is not susceptible to damage with a four-cycle engine applied, but also it is driven in good and comfortable condition without causing water pollution or a foul odor with very little HC discharged.

Furthermore, the engine maintains a large amount of efficiency of air into the engine by using the supercharger 3, being capable of developing high power with the relative small and light body. As the supercharger 3 is located on the downstream of the carburetor 31, the air that is drawn into the carburetor through the air cleaner, is mixed with fuel and then introduced into the supercharger 3, whereby the mixture is fully stirred up and introduced into the intake manifold, thus for keeping the mixing rate of mixture in each cylinder in a good condition and developing great power. In the case of the conventional vertical type engine with multi-cylinders, the mixing rate of gas in each cylinder has been different, sometimes causing unsteady rotation of the engine. In the case of a four-cylinder engine with a carburetor only, the difference of the mixing rate in each cylinder is 3 to 4%, but in this embodiment with four cylinders, the difference is 0.2 to 0.4% because the mixture is introduced into the engine after it has been mixed in the supercharger 3.

FIG. 3 is a cut side view showing a part of the outboard engine in the second embodiment.

FIG. 4 is an A—A line cross-sectional view of FIG. 3. This outboard engine is a four-cylinder gasoline engine 1, and on the downstream of the carburetor (not illustrated) is fixed the supercharger 3. The supercharger 3 and each port of the cylinders are connected through the intake manifold, through which a passage 6 of mixture is introduced into the engine 1. The cooling water passage with a section as shown in FIG. 4 is located around the intake manifold 5. Water from outboard is introduced into the cooling water passage through the water pipe 10 and the connecting hose 11 from the cooling water intake hole.

The water is drawn in by the water pump 8 from the outboard and introduced into the cooling water passage 7 and pumped outboard again through the outlet 0 after circulating and cooling mixture in each mixture-supplying passage 6 in the intake manifold. In this process, the mixture heated to about 110° C. by the supercharger 3 is cooled by the cooling-water passage 7. As the result, the process increases the power of the engine by about 5% solving the problem of the supercharger itself in that the hot air or mixture heated to about 110° C. with the compression by the supercharger decreases the increasing rate in power by supercharging.

Furthermore, thanks to this invention, as the intake manifold itself is cooled by the cooling water passage 7, the cooling of the supercharger is effected at a low cost without much space and any cooler attached.

Figure 5:
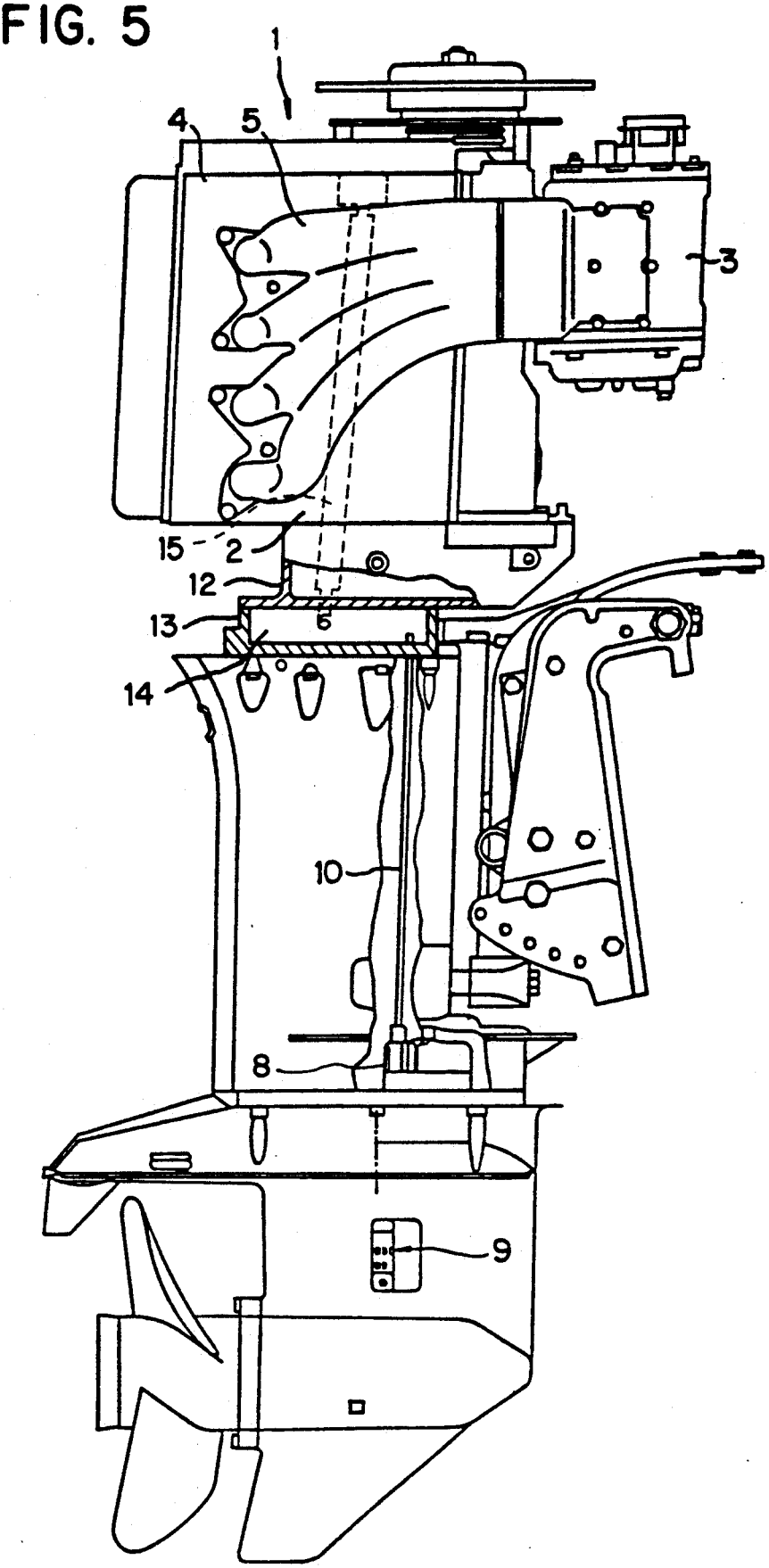
FIG. 5 is a cut side view for showing a part of an outboard engine in the third embodiment.

FIG. 5 is a cross-sectional side view of an outboard engine in the third embodiment. In a four-cycle engine used for an outboard engine, an oil pan needs to be attached for pooling lubricating oil for the engine 1, differing from the case of a two-cycle engine in which lubricating oil is mixed with fuel oil.

However, there has been a problem in that the heated lubricating oil in the oil pan attached at the lower end of the cylinder block 2 causes the burning out of the engine 1.

Therefore, in the outboard engine of this embodiment, the engine base 13 is attached under the oil pan 12 in such a way that the cooling water circulates along the wall of the oil pan over the engine base 13 through the oil-cooling water passage 14. The base of the oil-cooling water passage is connected to the water pipe 10, the water pump 8 and the cooling water inlet 9. The upper part of the oil-cooling water passage 14 is connected to the water hose 15, which leads to outboard by way of the engine 1.

While the engine 1 is operating, water from the outboard is drawn into the cooling water passage 14 attached at the engine base 13 through the water passage 14 attached at the engine base 13 through the water pipe 10 from the cooling water inlet 9 by the water pump 8 driven by the crankshaft (not illustrated). The water circulates along the base of the water pan 12, cooling the lubricating oil, and is discharged to the outboard through the water hose 15. Therefore, the engine 1 is cooled and prevented from burning out by lubricating oil that is always kept at a low temperature.

Needless to say, it is possible to make an engine equipped with the cooling water passage with a section as shown in FIG. 4, around the intake manifold 5 and with the cooling water passage 14, in the engine base 13, circulating along the base of the oil pan 12, as shown in FIG. 5, combining the above second embodiment with the third.

Figure 6:
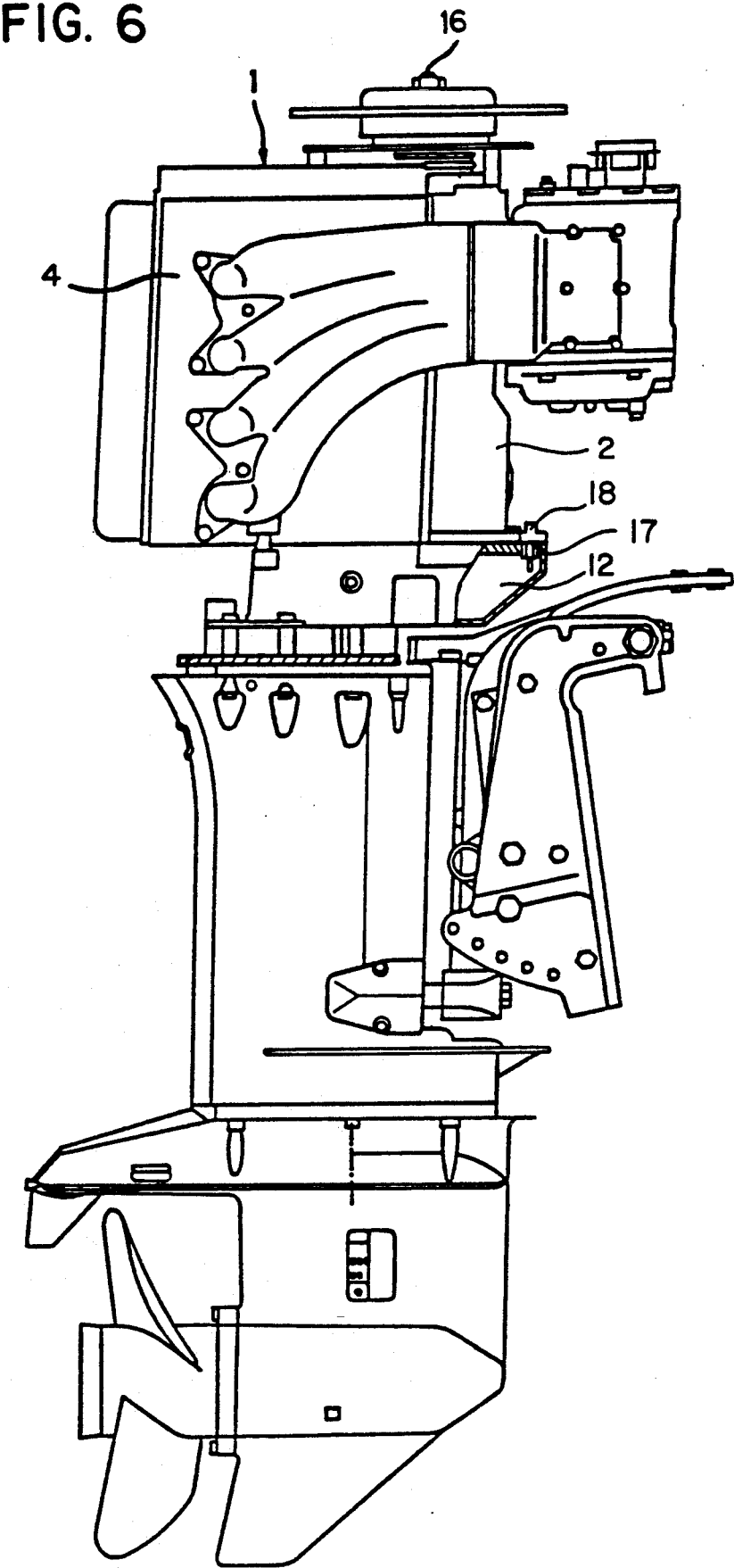
FIG. 6 is a cut side view for showing a part of an outboard engine in the fourth embodiment.

FIG. 6 is a cross-sectional side view for showing a part of an outboard engine in the fourth embodiment. In a four-cycle engine, the oil filler hole attached at the lower end of the cylinder block 2 has been located on the cover of the cylinder head 4. However, as the crankshaft of an engine is attached vertically, the cylinder head 4 is located at the rear of the engine. As a result, the lubricating oil filler hole is placed far on board, making it difficult to add lubricating oil, inspect the oil condition and keep the oil in proper level, increasing the possibility of the engine burning out.

Therefore, in this embodiment, the oil filler hole for the lubricating oil is located at the upper part of the oil pan 12 fixed at the lower end of the cylinder block 2 so that it may be located at the side of the boat's hull body against the crankshaft 16, and to this supplying hole the inspection bar 18 is attached with screws. Therefore, the supply of lubricating oil to the oil pan of the engine 1 can be accomplished on board, and the inspection of the oil condition can also be done easily while on board, making it possible to supply the proper amount of oil. Thus the engine 1 is prevented from burning out, with a proper amount of lubricating oil always provided.

Figure 7:
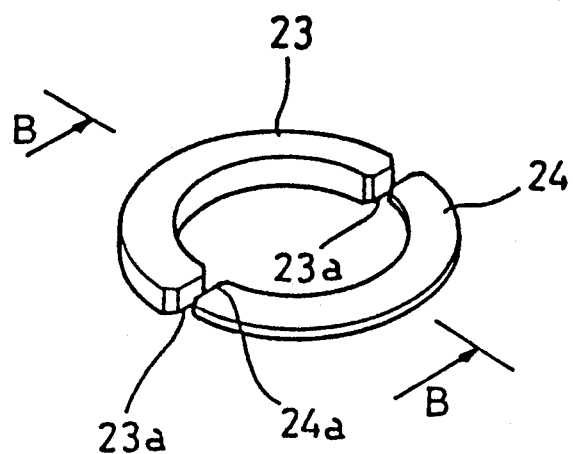
FIG. 7 is a side view of the thrust metal of an outboard engine in the fifth embodiment.
Figure 9:
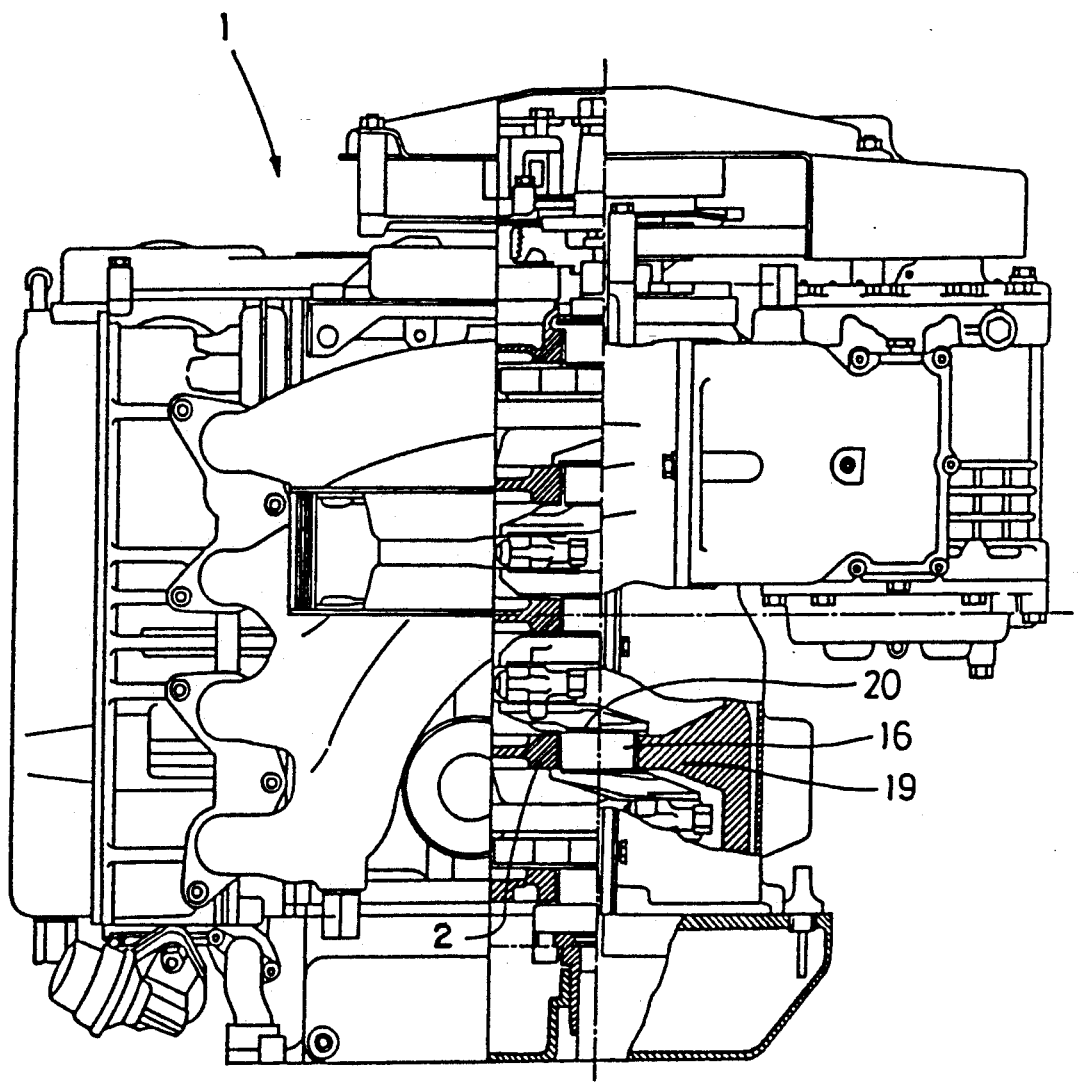
FIG. 9 is a cut side view for showing a part of a conventional engine body.
Figure 10A:
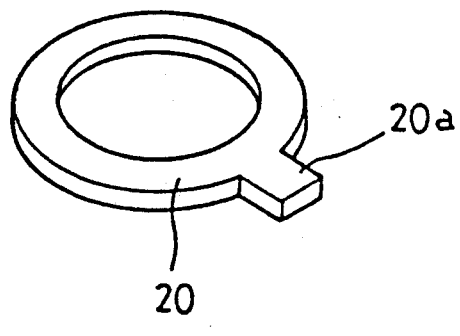
FIG. 10 is a side view for showing two embodiments of the thrust metal of the crankshaft bearing in FIG. 9
Figure 10B:
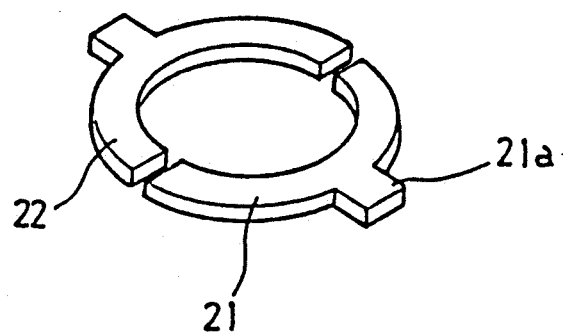

FIG. 7 is a side view of thrust metals 23 and 24 of the outboard engine in the fifth embodiment. In a conventional outboard engine, the thrust metals, to bear the load of the crankshaft 16, have been attached to in the cylinder block 2 of the crankshaft bearing and the bearing cap as shown in FIG. 9. The united thrust metal 20 in FIG. 10 (a) must be attached only at the lowest end of the crankshaft 16 and changing the attached place freely is quite impossible. In order to improve this problem, the thrust metals 21 and 22 in FIG. 10 (b) are of separate construction.

However, regarding the thrust metals 20 and 21 the projections 20a and 21a are formed to block the rotation so that they may not rotate with the crankshaft 16 as shown in the figure. In order to hold the rotation block projections, grooves are made in the solid construction of the crankshaft bearing. This type of rotation-block construction increases the machining processes.

Figure 8:
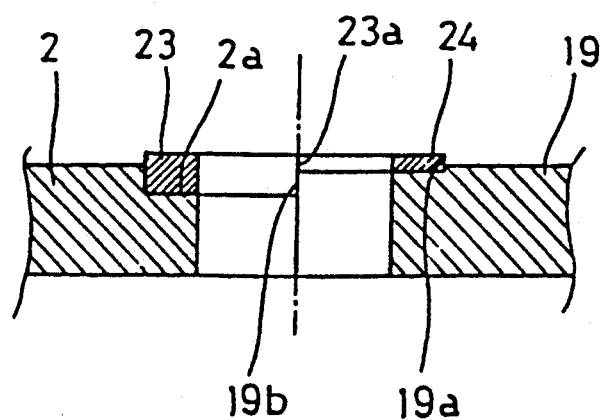
FIG. 8 is a B—B line cross-sectional view of the FIG. 7

On the contrary, the thrust metal in this embodiment is composed of the semicircular separate bits 23 and 24, which are different from each other in thickness as shown in the cross sectional view in FIG. 8. To hold these bits 23 and 24, the semicircular grooves 2a and 19a are made in the cylinder block 2 of the crankshaft bearing and the bearing cap 19. The grooves differ in depth according to the difference in their thickness. In this embodiment, the thicker bit 23 is attached in the semicircular groove 2a in the cylinder block 2, and the touching surface 23a prevents the rotation by touching the surface 19b of the groove 19a in the bearing cap 19. On the opposite side, the bit 24 is prevented from rotating by making the surface 24a touch the surface of 23a of the other bit 23.

What is claimed is:

1. An outboard engine comprising:
a four-cycle engine having a crankshaft extending substantially vertically while running; and
a thrust metal mounted on bearing portions formed on a cylinder block and a bearing cap of the engine, respectively, for supporting the crankshaft, said thrust metal being composed of a pair of semicircular plates having a different thickness from each other;
said semicircular plates being received within semicircular grooves formed on said bearing portions of the cylinder block and the bearing cap with different depth from each other, respectively, in such a manner that the mating surface of one of said semicircular plates having larger thickness contacts the end surface of one of said semicircular grooves having shallower depth.

* * * * *